Oct. 6, 1959     A. G. REYNOLDSON     2,907,140
METHOD OF INCREASING THE MOISTURE CONTENT OF
SOILS AND PREVENTING WIND EROSION
Filed April 15, 1955                          2 Sheets-Sheet 2
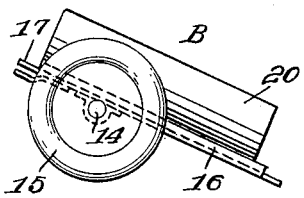
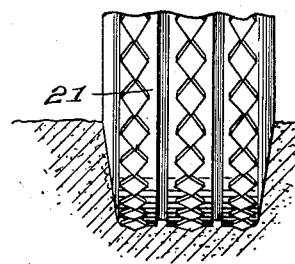
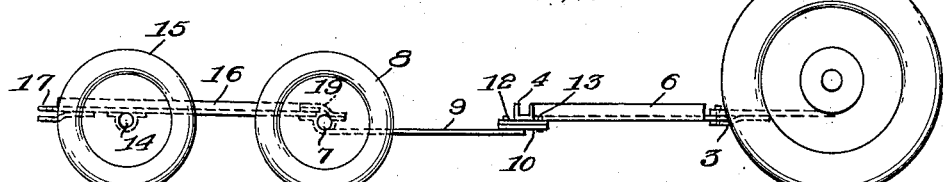
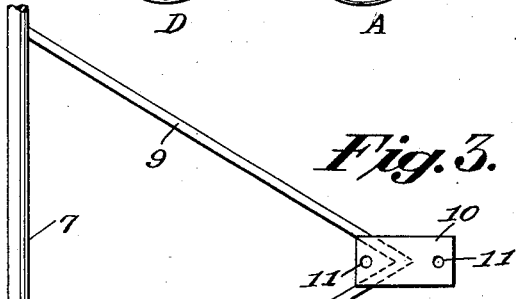
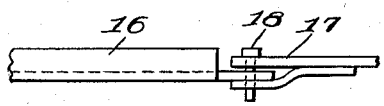
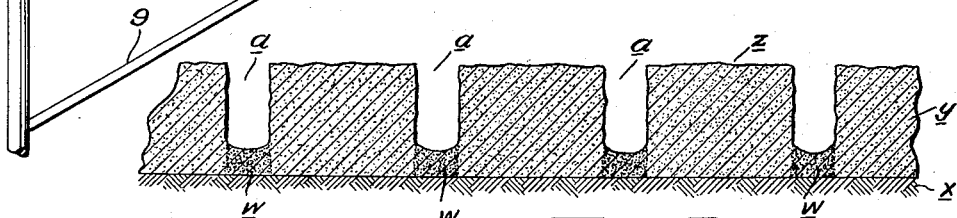
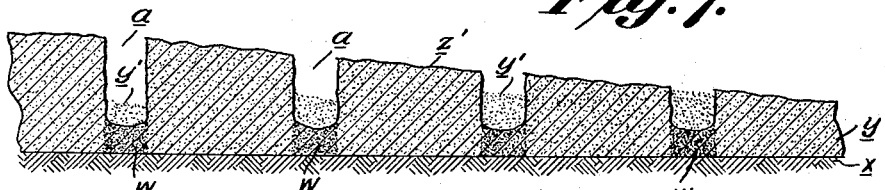
INVENTOR
Alvin G. Reynoldson.
BY Stone, Boyden & Mack,
ATTORNEYS.

United States Patent Office 2,907,140
Patented Oct. 6, 1959

2,907,140

METHOD OF INCREASING THE MOISTURE CONTENT OF SOILS AND PREVENTING WIND EROSION

Alvin G. Reynoldson, Crawford, Nebr.

Application April 15, 1955, Serial No. 501,497

2 Claims. (Cl. 47—58)

This invention relates to a method of increasing the moisture content of soils and preventing wind erosion, more particularly for soils which have been covered with snow.

In many sections of the country, as for example, the great grain-growing region of the middle west, fall-sown crops are dependent to a large extent for the moisture required for their spring growth upon the amount of snow fall which covers the ground during the winter months.

As is well known, it frequently happens that, after a fall of snow has occurred, large areas in exposed locations are swept clean of snow by the winds, thus depriving the crop of the needed moisture.

An object of the present invention, therefore, is to so treat the snow as to decrease the likelihood of its blowing away and leaving the ground bare, or, in other words, to cause more snow to remain on the ground over a given area, and thus increase the amount of moisture absorbed by the soil.

To this end, the invention contemplates drawing over the snow-covered ground a group of laterally-spaced wheeled units so as to form a series of parallel ruts or furrows in the snow. The wheels will compact or compress the snow at the bottom of these ruts or furrows, thus increasing its resistance to being blown away, while, at the same time, the wind may drift loose snow into the ruts or furrows, thus partially or completely filling them, thereby increasing the amount of snow lying on the soil at these points.

In order that the invention may be readily understood, reference is had to the accompanying drawings, forming part of this specification, and in which:

Fig. 2 is a side elevation thereof.

Fig. 3 is a fragmentary plan on an enlarged scale, showing the front part of one of the wheeled vehicles which I employ.

Fig. 4 is a side elevation on an enlarged scale, illustrating means which I may employ for coupling the vehicles.

Fig. 5 is a fragmentary edge elevation on an enlarged scale, illustrating a type of wheeled tire which I may employ.

Fig. 6 is a side elevation on the same scale as Figs. 1 and 2, showing one of the vehicles, equipped with a weight.

Fig. 7 is a cross-sectional view, showing a portion of the ground having a covering of snow thereon and illustrating the effect produced by my improved apparatus, shown in Figs. 1 and 2.

Fig. 8 is a similar view, illustrating the effect of wind on a snow-covered field, such as shown in Fig. 7; and Fig. 9 is a similar view, showing the further effect of continued and more severe winds.

Figure 1:
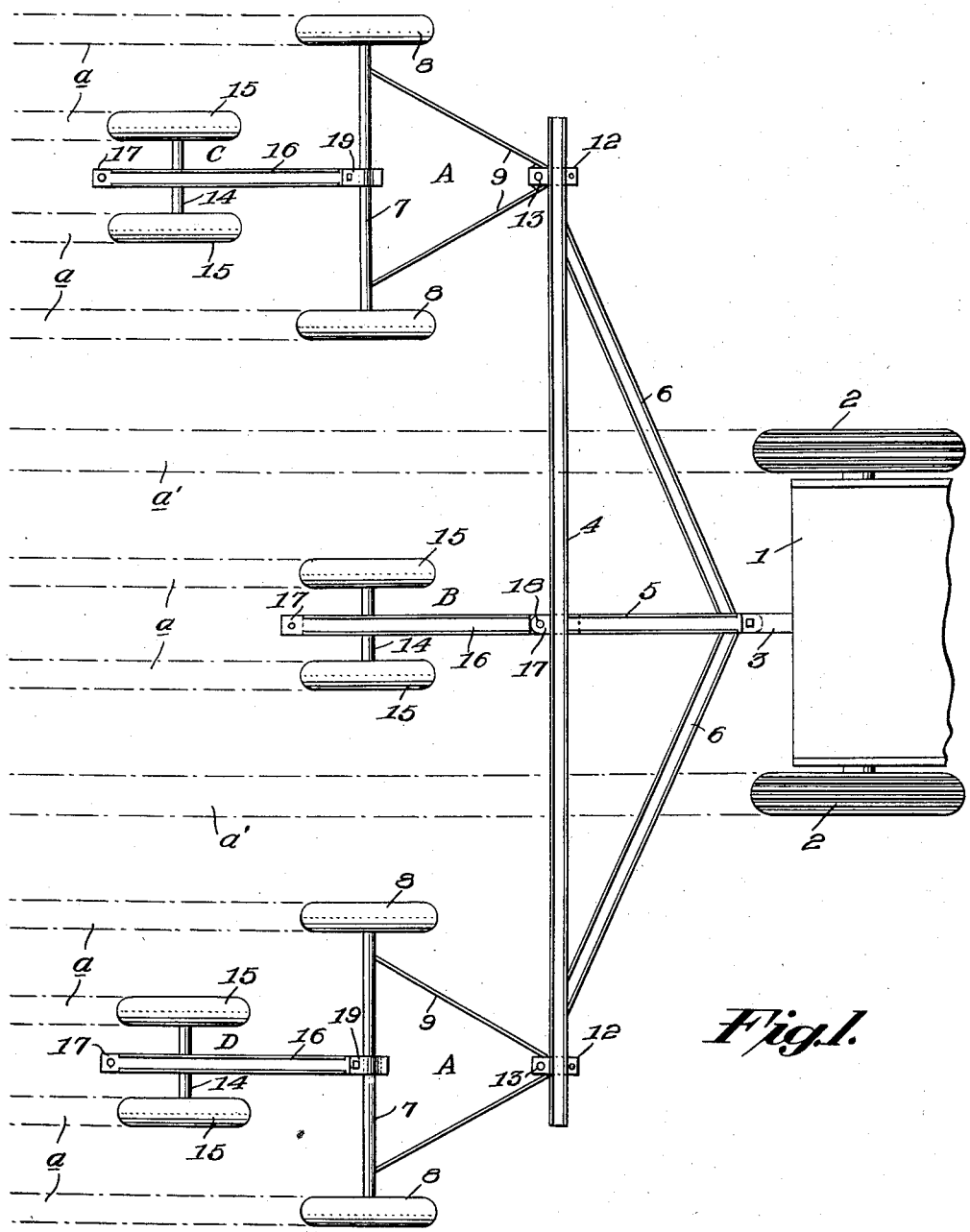
Fig. 1 is a plan view, showing the arrangement of my improved apparatus for treating snow-covered fields.

Referring to the drawings in detail, 1 designates an automotive vehicle such as a conventional farm tractor, having the usual or any suitable wheels 2 and a draw bar 3.

Coupled to this draw bar is a transversely extending draw frame comprising a beam 4, preferably in the nature of a channel member, a central brace 5, and a pair of diagonally extending members 6, thus forming a rigid trussed structure.

Attached to this draw frame, near each end, is a two-wheeled vehicle unit A, comprising an axle 7, carrying a pair of relatively widely-spaced wheels 8, and a pair of reach rods 9. By reference to Fig. 3, it will be seen that these reach rods, at their meeting end, are welded to the underside of a plate 10, having a pair of bolt holes 11. As shown in Fig. 2, this plate 10 is adapted to engage a similar plate 12, welded to the frame member 4, and bolts 13 pass through the holes 11, and similar holes in the plate 12, and thus secure the parts together. In other words, it will be noted that the vehicle units A are detachably connected with the draw frame.

Secured to the middle of the draw frame, as by means of a coupling member 17, and pin 18, is a third 2-wheeled vehicle unit B. This consists of an axle 14, carrying a pair of relatively closely-spaced wheels 15, and a central beam or draw bar 16.

Likewise, a pair of two-wheeled vehicle units C and D are secured to the axles 7 of the units A by means of a suitable coupling 19, these units C and D being similar to the unit B and having their wheels spaced approximately the same distance apart.

It will be particularly noted that the distance between the wheels 15 is preferably about the same as the lateral distance of each wheel 15 from the wheels 8 of the unit A. It will be further noted that the distance between the wheels of unit B is about the same as the lateral distance from these wheels to the wheels 2 of the tractor.

Referring again to Fig. 1, I have indicated, in broken lines, the tracks or furrows that the apparatus illustrated would make if drawn across a snow-covered field. These tracks, furrows, or ruts, made by the wheels 8 and 15, are designated $a$, while the tracks or furrows made by the wheels 2 of the tractor, are designated $a'$. It will be observed that all of these tracks or ruts are parallel with each other and that they are all spaced substantially the same distance apart, throughout the entire width of the apparatus, the tracks made by the wheels of the unit B, lying between the tracks made by the wheels of the tractor.

In Figs. 7, 8 and 9, are shown cross-sections of a piece of snow-covered ground, over which my improved apparatus has been drawn. In these figures, $x$ designates the ground, and $y$ the mass of snow which covers it. The upper surface $z$ of this snow is shown in Fig. 7 as substantially level, and the ruts or furrows made in the snow by the several wheels are shown at $a$. It will be particularly noted that the ruts are of a depth somewhat less than the depth of the snow and that at the bottom of these ruts or furrows are masses or strips $w$ of compressed or compacted snow, the same having been pressed down by the weight of the vehicle wheels.

Fig. 8 illustrates the effect of wind on a snow-covered field, such as shown in Fig. 7. Here it will be noted that the snow has drifted, the upper surface $z'$ being no longer level, and loose drifted snow having been deposited to a greater or lesser extent in the ruts on top of the compact strips $w$, as indicated by $y'$. It will be particularly noted that in the condition illustrated in Fig. 8, there is substantially more snow present in the region of the tracks or ruts than in the spaces between them.

In Fig. 9, I have attempted to illustrate the effect of continued, or more severe winds, on the snow field, shown in Fig. 8. Here, practically all of the loose snow has been blown away. However, the compacted strips $w$, which were at the bottom of the ruts or furrows have been able to resist the wind to a large extent and remain in position as more or less hard ridges, and against these ridges, on either side, a certain amount of loose snow will lodge and be held, as shown at $u$ and $v$. Thus, these ridges prevent the ground from being swept bare of snow, as it otherwise would be, with the result that the snow thus retained, when it melts, will substantially increase the amount of moisture in the soil, as compared with the amount in an untreated area.

In addition to increasing the amount of moisture in the soil, as above explained, the hard ridges of compacted snow, as shown in Fig. 9, have another and very beneficial effect. I find that these ridges serve as wind-breaks to prevent the wind erosion of the soil, during relatively dry seasons.

It has been common practice to attempt to minimize wind erosion by employing so-called "strip farming," that is, dividing a field into strips or bands, alternate strips being seeded to a crop and the intervening strips being covered with previously grown stubble or other protective growth. This stubble or other growth serves to catch and hold snow, and also serves to some extent as a barrier to break the force of the wind sweeping over the seeded strips. It has been found, however, that the protecting strips are not very effective in preventing wind erosion of the planted strips, as these strips run from 150 to 200 yards wide, and the stubble is usually not more than 12 to 15 inches high.

I find, however, that if the snow-covered seeded strips are treated with my apparatus in accordance with the present invention, in such a manner that the snow ridges shown in Fig. 9 extend longitudinally of the strips, these ridges, in combination with the protective strips, are highly effective in preventing wind erosion of the soil.

While in Figs. 1 and 2, I have shown the wheels equipped with conventional tires, it may be preferable to employ tires with a broad, flat tread, as indicated at 21, in Fig. 5, as this is more effective in compressing and compacting the snow.

Also, while in some cases the mere weight of the wheeled units, illustrated in Fig. 1, is sufficient to produce the desired result, in some cases it may be preferable to apply an additional weight to the units, as by means of a sand box 20, as shown in Fig. 6.

Referring again to Fig. 1, beams, or draw bars, 16 of the various units, have at one end a tongue adapted to receive the coupling pin 18, shown in Fig. 4, and at the other end formed with a coupling similar to that shown at 17, in Fig. 4. Thus, when it is desired to transport my improved apparatus from field to field, through gateways, or along a highway, the draw frame 4, 5, 6, is uncoupled from the draw bar 3 and from the several units, and the units themselves are coupled direct to the tractor draw bar and to each other, one behind the other in tandem, to form a train, which may be readily handled.

What I claim is:

1. The method of preventing wind erosion of soils which comprises dividing a field into alternating seeded and growth-covered strips, and forming on the surface of the seeded strips when the field is covered with snow a series of parallel, spaced, relatively narrow ruts or furrows longitudinally of said strips of a depth somewhat less than the depth of the snow, and, during formation of said ruts or furrows, compacting the snow at the bottom thereof, the open portions of the said ruts or furrows, along with the growth-covered strips, being effective to trap wind blown snow, and the compacted snow at the bottom of said ruts or furrows being slower to melt and dissipate than is the uncompacted snow, whereby, as the depth of the snow decreases, said compacted snow constitutes a series of wind-breaking ridges, in addition to the growth-covered strips.

2. The method for treating a snow-covered field to increase the moisture content of the soil and prevent wind erosion, comprising simultaneously forming in the snow over the entire area to be treated a series of parallel, spaced, relatively narrow ruts or furrows of a depth somewhat less than the depth of the snow and, during formation of said ruts or furrows, compacting the snow at the bottom thereof, the open portions of said ruts or furrows being effective to trap wind-blown snow and the compacted snow at the bottom thereof being slower to melt and dissipate than is the uncompacted snow whereby, as the depth of the snow decreases, said compacted snow constitutes a series of wind-breaking ridges.

References Cited in the file of this patent

UNITED STATES PATENTS

| | | |
|---|---|---|
| 61,326 | Doolittle | Jan. 22, 1867 |
| 328,263 | Waggoner | Oct. 13, 1885 |
| 760,455 | Hornblower | May 24, 1904 |
| 880,608 | Walgren | Mar. 3, 1908 |
| 979,255 | Brown | Dec. 20, 1910 |
| 1,021,529 | Johnson | Mar. 26, 1912 |
| 1,021,530 | Johnson | Mar. 26, 1912 |
| 1,302,543 | Hart | May 6, 1919 |
| 1,963,426 | Taylor | June 19, 1934 |
| 2,139,200 | Moyer | Dec. 6, 1938 |
| 2,152,212 | Reinkens | Mar. 28, 1939 |
| 2,303,043 | Goodman | Nov. 24, 1942 |
| 2,509,691 | McLemore | May 30, 1950 |
| 2,514,890 | McLemore | July 11, 1950 |
| 2,559,774 | Kunkel | July 10, 1951 |
| 2,675,645 | Deppe | Apr. 20, 1954 |

FOREIGN PATENTS

| | | |
|---|---|---|
| 477,216 | France | July 6, 1915 |

OTHER REFERENCES

Publications: Smith, "Snow Traps" published March 1946 in Roads and Streets (magazine), vol. 89, No. 3, pages 87, 88, 89. New York Times, Sunday, August 10, 1947, section 4, page E-11, article "Conserving Snow to Halt Droughts."